United States Patent [19]

Bussiére et al.

[11] Patent Number: 4,906,481
[45] Date of Patent: * Mar. 6, 1990

[54] PROCESS FOR MANUFACTURING MARBLED CHEESES

[75] Inventors: Guy Bussiére, Ramonville; Jean Lablee, Mamirolle, both of France

[73] Assignee: Roquette Freres, Lestrem, France

[ * ] Notice: The portion of the term of this patent subsequent to Jul. 25, 2006 has been disclaimed.

[21] Appl. No.: 303,070

[22] Filed: Jan. 30, 1989

Related U.S. Application Data

[63] Continuation of Ser. No. 942,975, Dec. 17, 1986, abandoned.

[30] Foreign Application Priority Data

Dec. 17, 1985 [FR] France ................................ 85 18687

[51] Int. Cl.$^4$ .................... A23C 19/032; A23C 19/05; A23C 19/068
[52] U.S. Cl. ........................................ 426/39; 426/40; 426/582
[58] Field of Search ....................... 426/34, 36, 37, 38, 426/39, 40, 42, 43, 61, 580, 582, 491, 657

[56] References Cited

U.S. PATENT DOCUMENTS 2,982,654  5/1961  Hammond et al. .
4,020,186  4/1977  Edwards ................................ 426/39

FOREIGN PATENT DOCUMENTS 7719109  6/1977  France .
1361817  7/1974  United Kingdom .

OTHER PUBLICATIONS

Hicks et al., Equipment & Procedure for Manufacture Laboratory Cheese Curd; 309 Journal of Dairy Science; vol. 64 (1981), pp. 523-525.

*Primary Examiner*—Marianne Cintins
*Attorney, Agent, or Firm*—Fleit, Jacobson, Cohn, Price, Holman & Stern

[57] ABSTRACT

In the process of the invention for manufacturing marbled cheeses from raw milk, in the course of the phase of preparation of the milk before renneting, an acidogen selected from the group consisting of gluconolactones and glucoheptonolactones is added to the milk in an amount sufficient to attain simply and reliably, in a predetermined time, the exact predetermined renneting pH comprised between 6.0 and 6.6, preferably between 6.0 and about 6.5. The acidogen is advantageously gluconodeltalactone. The process is applied in the manufacture of marbled cheeses with mastery of the acidification phase of the milk.

12 Claims, No Drawings

PROCESS FOR MANUFACTURING MARBLED CHEESES

This application is a continuation of application Ser. No. 942,975, filed Dec. 17, 1986, now abandoned.

The invention relates to a novel process for manufacturing marbled body cheeses or "marbled cheeses".

More precisely, the invention relates to a novel process for manufacturing marbled cheeses according to which the acidification of the milk before renneting is carried out in a controlled manner by means of an acidogen.

Within the scope of the invention, by marbled cheeses is meant, according to the classification given in the work "Le Fromage", coordinated by André ECK, Technique et Documentation (Lavoisier), Paris (1984), especially pages 220–221, in particular cheeses of which the interior is the site of a growth of mouldinesses of dark colour, of the Penicillium roqueforti type, such as blue type cheeses (danish, bavarian, Gex, Bresse, for example), fourmes cheeses, Gorgonzola, Stilton, Roquefort, and whose dry extract is generally from 45 to 55%.

It is recalled that, traditionally, the manufacture of marbled cheeses comprises essentially the following steps:

Preparation of the milk

This expression means the possible operations of bleaching (homogenization or chemical action), and heat treatment of the raw milk and the operation of maturation by the action of lactic ferments which leads to an acidification of the milk to a pH value corresponding to the requirements for the subsequent renneting step, generally comprised between 6.0 and 6.5.

Renneting

The matured milk is supplemented with coagulating enzymes.

Coagulation

The characteristics of the coagulum are closely dependent on the coagulation kinetics. Among the four basic parameters governing this physico-chemical reaction, which are: the coagulating enzymes, the soluble calcium, the temperature and the acidification, the acidification generated by the fermenting activity must evolve gradually throughout the phases of coagulation and draining.

Cutting-up - grinding (or milling)

Moulding - draining)

These operations are carried out so that the cheese retains a firm and aerated structure so as to permit, in the course of ripening, the development of the aerobic mould.

Taking from the mould - salting

At this stage, the cheese must have reached a pH value comprised between 4.6 and 5.0, this value being associated with the type of marbled cheese being manufactured.

Ripening - needling

This is the ultimate step in the manufacture of marbled cheeses which consists of keeping the cheese under controlled conditions of temperature and humidity, in order to promote growth of the micro-organisms. This phase comprises one or several needlings which consist of forming through the cheese "aeration chimneys" by means of needles possibly seeded previously with Penicillium spores which act on the organoleptic properties (texture and flavour) whilst permitting controlled enzymatic action.

By convention, in the following, all of the steps comprised between coagulation and ripening-needling will be designated by "*forming* step".

For a long time, the man skilled in the art has sought to optimize and industrialize the manufacturing processes for cheeses, and particularly marbled cheeses.

More precisely, numerous works have concerned the phase relating to the preparation of the milk. Thus it is preferred today to heat treat the raw milk for the destruction of its common flora in order to improve the bacteriological quality of the milk and to increase its preservability. This technique is now widely used in large capacity plants, when the use of raw milk is sooner reserved for plants of smaller size and for the manufacture of types of cheeses which have, for reasons of appellation of origin, to be obligatorily prepared from raw milk (Roquefort for example).

It remains nonetheless undeniable that the presence of lactic ferments is indispensable in cheese-making techniques. In fact, these lactic ferments play an essential part in the acidification phase of the milk leading to the formation of the coagulum and in the acidification phase of the curd up to the end of draining, as well as in the development of the organoleptic properties of the finished product.

In the case of raw milk, the common lactic flora, naturally present in the milk, traditionally ensured the acidification, without it being possible to exclude the eventuality of reinforcing its action by a further addition of lactic ferment cultures.

In the case of heat-treated milk, it is necessary to acidify it by seeding with lactic ferment cultures particularly, by suitable techniques.

To carry out this acidification, different variations are proposed at the present time, essentially by reason of the fact that the time separating the moment of arrival of the milk at the plant from that of its putting into cheese-making manufacture (renneting) is very variable since it depends among other things on the techniques of collection, the geographical areas of gathering, the period of the year, and the time of the week.

In a first variant, the most traditional, the phase of preparation of the milk comprises, besides the heat treatment and the standardization of the composition in fats and proteins, a maturation step whose acidification kinetics is directly a function of the amount of lactic leavens added This addition of lactic ferments must be moderated, in order to tend towards a mastery of this fermentation and to be able to carry out the rennenting at the required pH.

This maturation time is very variable since the frequency of reception of the milk at the plant and the frequency of placing in use are very disvordant, whence "holding times" (storage buffer times) varying from some hours to some tens of hours.

In addition, the renneting pH must be fully respected, according to the type of marbled cheese manufactured. But then, taking into account an almost exponential growth phase of the lactic flora, the pH decreases too rapid)y, rendering extremely delicate the determination of the moment at which the addition of the coagulating enzymes must be done (renneting).

Moreover, the maturation being generally carried out for economic and practical reasons in vats or "tanks" of very large capacity, upon the taking up of the milk for renneting, the contents of each "tank" is distributed between several renneting vats of distinctly lower capacity, whence between the first and the last vat filled and renneted, there are different maturation times, whence different pHs on renneting. These reasons enable the difficulties encountered during the mechanization of these operations to be well understood.

To palliate these drawbacks, another variant has been proposed. It comprises, after the customary operations of reception of the milk and first heat treatment, a first maturation phase accelerated or not by the addition of a larger or smaller dose of lactic ferments. The mastery of the pH is achieved by a second heat treatment selected so as to destroy either partly, or almost the whole of the lactic flora; the subsequent progress of acidification is produced by the residual fraction of lactic ferments under the first hypothesis, or by a further addition of lactic ferments under the second hypothesis.

This second heat treatment proves to be a expensive additional operation and especially very delicate to the extent that, in the vicinity of the renneting pH, the case in of the milk has become more unstable and more sensitive to temperature, whence a risk of "gratination" (deposit of residues on the walls of the heat exchangers). This drawback can be limited by carrying out this heat treatment at a pH higher than about 6.3, taking care to have an equipment ensuring a ΔT (temperature difference between the hot wall and the cold wall) which is minimal.

Now, it is well known to the man skilled in the art that the pH on renneting conditions the coagulation and the subsequent operations, as well as the characteristics of the finished product. The existence of this threshold at a pH in the vicinity of 6.3 hence limits the technological possibilities of the manufacture of marbled cheeses.

If the maturation is an almost indispensable operation, it is however very variable in intensity: certain cheeses (fourme Cheeses, Gorgonzola particularly) require weakly matured milks whereas other cheeses (Auvergne blue, for example) need more matured milks.

The additions of exogenic lactic ferments, carried out in the form of commercial preparation, may be of different natures according to the desired aim, which may be only acidification, but which is often more complex, for example: acidification, proteolytic activity, gas release enabling an expansion of the "opening" of the pastes or bodies. To arrive at the desired results, mostly homofermenting lactic bacteria are used, such as mesophilic, thermophilic, streptococcic, lactobacilic bacteria, but also hetero-fermenting lactic bacteria for example of the Leuconostoc type.

It is appropriate in this respect to note that, in the case of the use of lactic ferments, the acidifying mesophiles which have an almost exponential growth phase must be employed in a very low ratio so that the pH on taking from the mould does not drop below the optimal value comprised between 4.6 and 5.0. This is a further restraint in the case of the use of lactic ferments in the course of maturation of the milk in the manufacture of marbled cheeses.

Often, a seeding with penicillium spores is carried out from the stage of preparation of the milk.

The preparation of the milk frequently comprises a homogenization operation of the milk or of the cream alone separated by centrifugation, then reintroduced into the "milk" phase, and a bleaching operation of the milk or of the cream by means of an authorized bleaching agent such as those based on chlorophyll.

In any event, whatever the method of maturation proposed until now, the maturation time is very variable and difficult to control, which renders very difficult the industrialization of the manufactures.

There is therefore an interest which is certain in developing a new process making possible the elimination of the above-described drawbacks, inherent in the operation of preparation of the milk for the manufacture of marbled cheeses.

Applicants have developed a novel process for the manufacture of marbled cheeses enabling the mastery of the step of preparation of the milk, thus facilitating automatization of the production lines, and this without the organoleptic properties of the finished products being modified disadvantageously.

This novel process for manufacturing marbled cheeses characterized by the fact that the milk is acidified in a controlled manner, particularly from its initial pH value on reception, comprised customarily between 6.6 and 6.8, to a pH value comprised between 6.0 and 6.6, preferably between 6.0 and about 6.5, by means of an acidogen.

Applicants have in fact observed that, surprisingly the use of an acidogen enabled simply and reliably the reaching of pHs before renneting which are relatively low, and this in a predetermined time and without unfavourably affecting the subsequent steps of the manufacture of the marbled cheese and the organoleptic characters of the products obtained.

The milk, raw material serving for the manufacture of marbled cheeses according to the present invention, may be any milk or mixture of milks of any origin, in particular those customarily employed in the manufacture of marbled cheeses according to the prior art.

By acidogen, is meant here any substance neutral from the point of view of the pH and capable, after solubilization in an aqueous medium, of being gradually converted into an acid.

Among substances of this type, are found certain acid anhydrides, lactides and particularly those with a low melting point of lactic acid, lactones such as gluconolactones and glucoheptonolactones, and the like and/or their mixture.

These definitions being given, according to the invention there is provided a process for manufacturing marbled cheeses comprising the successive steps of preparation of the milk, renneting, coagulation, forming and ripening-needling, characterized by the fact that in the course of the phase of preparation of the milk, the latter is acidified in a controlled manner to a pH value comprised between 6.0 and 6.6, preferably between 6.0 and about 6.5 by means of an acidogen It is well known that the kinetics of transformation of an acidogen to an acid is strictly dependent on the temperature of the aqueous medium in which it is solubilized. Consequently, from the three basic parameters of the milk used in the cheese-making industry which are:
the initial pH of the milk,
the pH required for renneting,
the temperature of the milk,
the technician can determine with accuracy the dose of acidogen to be incorporated and the time required to reach the desired renneting pH, knowing with certainty the hydrolysis kinetics of the acidogen.

This improvement brought about by the addition of acidogen at the time of maturation therefore leads to a complete and full mastery of the phase of preparation of the milk, thus improving the conditions of automatization of the production lines of marbled cheeses.

This addition of acidogen may be made indifferently in the form of powder or in the form of solution.

In the case where the acidogen is added in powdered form, its dispersion in the milk and its solubilization are ensured by any suitable stirring means.

In the case where it is preferred to add this acidogen in the form of a solution, the latter is advantageously prepared at the time of use, in order to limit as much as possible the hydrolysis of the acidogen. In fact, if through this hydrolysis, the solution of the acidogen shows too great an acidity, the well-known drawbacks associated with the direct use of acids in the industrial production of marbled cheeses would again appear.

In practice, and taking into account the particularities peculiar to each manufacturing line for marbled cheeses, the technician, knowning the hydrolysis kinetics of the acidogen employed, will determine the best moment for introducing it.

By way of indication, the acidogen could be introduced:
  into the raw milk, or
  into the milk after the possible heat treatment.

It is well understood that other modification could be envisaged.

In all cases, it is convenient, to determine the moment at which the acidogen must be introduced, to take into account its hydrolysis kinetics at the temperature of the milk at the moment of the introduction and up to renneting.

In certain cases, it will be preferred to choose an acidogen dose such that, after complete hydrolysis of this agent, the milk is at the pH required for renneting. In other cases, this dose could be higher, so that the hydrolysis of the acidogen at the pH determined for renneting is incomplete, thus facilitating subsequent acidification of the renneted milk.

Thus a suitable dose of acidogen can enable mastery of the acidification in the course of the manufacturing steps which follow renneting, particularly by ensuring a reproducible drop in pH from renneting to coagulation and then at least until cutting with grinding.

This controlled acidification on renneting and in the course of the steps which follow renneting is advantageously practiced when the ferments employed for the subsequent acidification of the curd have a long latent period, particularly in the case of the use of ferments for the direct seeding of the milk, used in frozen or lyophilized form.

In the same way, Applicants have observed that the controlled acidification on renneting and in the course of the steps which follow renneting, would permit, under certain conditions, a reduction in manufacturing times.

Besides the technical advantages associated with the mastery of the pH during the maturation and through this fact with the improvement in the possibilities of automatizing the production lines of marbled cheeses, Applicants have, as has been stated above, established the fact that the replacement of the lactic ferments by an acidogen in the maturation phase of the milk was, unexpectedly, without significant incidence on the characteristics of texture and taste of the ripened marbled cheeses.

The process according to the invention does not however involve, for all that, the elimination of lactic ferments or of any other ferment. It is in fact possible to introduce lactic ferments or any other microorganism in the course of the employment of the process according to the invention in an amount and at a moment which will be a function of the technological or qualitative objectives sought, such as for example, particular organoleotic characters.

Thus, lactic ferments, in particular bacteria other than mesophiles (thermophiles, hetero-fermenting) may be introduced, even at the moment of maturation. On the other hand, if a seeding with mesophilic bacteria is carried out from maturation, it is necessary for their amount to be sufficiently low not to signicantly influence the kinetics of reduction of the pH, in order not to re-encounter the drawbacks of the prior art. On the other hand, the amount of mesophilic lactic ferments could be greater if they are added at the moment of renneting.

The invention enabling the elimination of the need for heat treatment in the course of or at the end of maturation of the milk, renders possible the lowering of the pH on renneting to a value below 6.3, which permits on the one hand a larger range of variations at the level of texture and taste of the ripened marbled cheeses and on the other hand the reduction of the dose of coagulating enzymes, which is economically advantageous.

The acidogens used preferably within the scope of the invention are the gluconolactones and the glucoheptonolactones, more preferably the gluconolactones and particularly gluconodeltalactone (GDL).

Besides the aforesaid advantages, the excellent solubility in aqueous media of GDL and its hdyrolysis kinetics at the temperatures traditionally encountered during the maturation of the milk for the manufacture of marbled cheeses, render it perfectly adapted to the requirements particular to the manufacture of these cheeses.

Advantageously, the amount of acidogen employed within the scope of the invention is from 2 to 2000 g/hl of milk. Preferably, it is comprised between 5 and 1000 g/hl of milk and, more preferably, between 10 and 500 g/hl of milk, according to the acidogen used.

Thus, in the particular case where the acidogen is GDL, the amount employed is advantageously from 5 to 500 g/hl of milk. Preferably it is comprised between 10 and 300 g/hl of milk and, more preferably, between 20 and 200 g/hl of milk.

The invention will be better understood by means of the examples which follow and which comprise the description of advantageous embodiments. All these examples have been carried out by the I.T.I.L. on the premises of Ecole Nationale d'Industrie Laitière of MAMIROLLE - BESANCON (France).

Examples of the manufacture of "blue" type marbled cheeses

EXAMPLE 1 - Control

From the production at the farm to the end of the preparation, the milk is subjected to the usual industrial conditions at the establishment where this test is carried out, namely: received the day before in the evening, the milk is kept in a "holding" vat at 6° C. until the following morning; it then undergoes the following preparation treatment.

210 l of milk are prepared under the normal industrial conditions: standardization in composition at 34 g/l of fat per mixture of 21 l of skim-milk and 189 l of whole milk, these two fractions undergoing successively a heat treatment on a plate exchanger at 72° C. for 40 seconds with an outflow temperature of 38° C. In industrial practice, the skim-milk fraction is prepared first: the whole milk undergoes a first reheating to 50° C. in the plate exchanger, then it passes into the skimmer: the skimmed milk then comes back into the exchanger where it undergoes the end of the heat cycle: 72° C. for 40 seconds and then cooling to 38° C. 21 l of this heat treated skim-milk are led into the maturation tanks.

The heat treatment of the whole milk is then carried out and 189 l of this milk at 38° C. are mixed with the 21 l of skim-milk. Thus 210 l of standardized and heat-treated milk are obtained.

The pH of the milk is then measured on the whole milk fraction at the time of its introduction into three basins of 100 l, in the amount of 70 l per basin. It is 6.60±0.02.

An addition of soluble calcium salt is then made in the amount of 42 ml of a solution comprising 520 g/l of calcium chloride.

Seeding is then carried out by the addition of:

mesophilic lactic ferments employed in the following conditions: a concentrated and frozen preparation, marketed by MILES Laboratories - Division Marshall (rue des Longs Réages - 28230 EPERNON - France) is cultivated on the nutrient medium Marstar, marketed by the same Laboratories, applying strictly the preparation conditions recommended by said Laboratories. 0.4% of this culture (expressed in volume relative to the milk) namely 0.84 l, is then mixed with the milk;

lactic ferments of thermophilic streptococci type prepared previously as follows: a frozen concentrated commercial preparation, coming from MILES Laboratories - Division Marshall, is cultivated on the nutrient medium marketed under the name 412 A by MILES Laboratories applying strictly the preparation conditions recommended by these Laboratories. 1,5% of this culture, namely 3.15 l, are mixed with the milk;

thermophilic lactic ferments constituted by a mixture of a lyophilized preparation of thermophilic streptococci (same nature and same source as above) and a lyophilized preparation of Lactobacillus helveticus and lactis coming from the LACTO-LABO Company (B.P. 10 - 23 rue du Collège - 86220 DANGE-SAINT-ROMAIN - France) cultivated on skim-milk sterilized in the autoclave under conditions selected so that, after incubation, the culture contains approximately 50% of streptococci and 50% of Lactobacillus (estimation done by microscopic examination). 0.1% of this culture, namely 0.21 l, is mixed with the milk;

spores of Penicillium roqueforti and Geotrichum candidum marketed by the same LACTO-LABO Company, added in the proportion of 100 million spores of each of them.

The time permitting the reaching of the desired pH of about 6.20 is of the order of 70 minutes.

In the present case:
pH=6.20±0.02
temperature: 35° C.

The renneting of each 70 l basin is ensured by addition of 0.15 ml/l of milk of a commercial preparation of coagulating enzymes containing 520 mg of chymosin per liter.

The setting time, that is to say the time between the moment when the enzyme is added and that when it is observed by manual examination that coagulation is starting, is 12 minutes on the average and 13 minutes in the case of this test. The milk is again left to coagulate, under traditional conditions, for a time equal to that of the setting time.

The coagulum is cut up in its basin by means of a hand-driven wire apparatus. After 12 minutes standing, a grinding of the curd is carried out, the latter is repeated once to three times with an equal standing time between two consecutive passages, according to the dry extract desired.

The contents of each basin is poured onto a cloth of the "gruyère" type and left to drain for two minutes into the bottom of an empty basin. Following this the curd without whey coming from each basin of 70 l is distributed into 21 perforated square moulds of 10 cm side.

The draining is carried out in premises at 25° C., the moulds being subjected to turning over four times: immediately after moulding, after 30 minutes, 3 hours and 8 hours.

The cheeses are taken from the moulds after 20 hours. Their pH is 4.70±0.02.

Brining enables the proportions of salt (sodium chloride) of the cheeses to be adjusted by dipping for 45 minutes in a brine comprising 170 g of salt/l of brine.

Sweating-drying

Taken out of the brine and drained, the cheeses are left for 24 hours in a ventilated place at 12°-13° C.

Ripening

The cheeses are placed on wattles and then placed in an air-conditioned site at 10° C. with a relative humidity of 95%. They are left in this site for about 20 days. Two needlings accompanied by turning over of the cheeses are carried out after 4 days and 10 days in the following manner: a device comprising 20 needles of 2.5 mm diameter enables each of the cheeses to be perforated from one side to the other, the object of this operation being to create "aeration chimneys" in order to facilitate the development of internal moulds or mould fungi.

After ripening, cheeses of the blue type are obtained, comprising throughout their mass a homogeneous growth of typical blue moulds.

EXAMPLE 2 according to the invention

It is identical with Example 1, except that:

from the introduction of the milk into the basins, there is added, per basin of 70 l, 112 g of gluconodeltalactone (GDL), marketed by ROQUETTE FRERES Company, 62136 LESTREM (France) namely 160 g/hl. Manual stirring enables the complete solublization of the GDL crystals.

the mesophilic lactic ferements are added on renneting.

The dose of gluconodeltalactone is defined so as to obtain a pH on renneting of 6.20±0.02, after 10 minutes of maturation, hence more rapidly, and more regularly, than in Example 1. The use of the GDL enables optimal values to be obtained, both on renneting and on taking from the mould.

RECAPITULATORY TABLE
Manufacture of marbled cheeses

| | Example 1 | Example 2 |
|---|---|---|
| Initial pH of the milk (±0.02) | 6.60 | 6.60 |
| GDL (g/hl) | — | 160 |
| Mesophilic lactic ferments (on maturation) (%) | 0.4 | — |
| Thermophilic streptococci (%) | 1.5 | 1.5 |
| Thermophilic mixed lactic ferments (%) | 0.1 | 0.1 |
| Maturation time (min) | 70 | 10 |
| pH on renneting (±0.02) | 6.20 | 6.20 |
| Ratio of coagulating enzymes (ml/l) | 0.15 | 0.15 |
| Mesophilic lactic ferments (on renneting) (%) | — | 0.4 |
| Setting time (min) | 13 | 10.5 |
| pH on taking from the mould (±0.02) | 4.72 | 4.75 |

The cheeses obtained according to Examples 1 and 2 show similar organoleptic characters (texture, flavour, appearance).

We claim:

1. A process for manufacturing marbled chesses form milk wherein the milk is acidified in a reproducible and reliable manner for renneting, comprising the steps of:
   providing a given volume of milk from which the marbled cheese is to be prepared;
   measuring the initial pH and the temperature of said milk;
   selecting a period of time within which the pH of the milk will be brought from the initial pH to a renneting pH, said renneting pH being between 6.0 and 6.6 and said renneting pH being the required renneting pH for the type of marbled cheese being manufactured;
   acidifying the milk for renneting solely by adding an acidogen to the milk, said acidogen being selected from the group consisting of gluconolactones and glucoheptonolactones and said acidogen being added to the milk in an amount which is the minimum amount required to bring the initial pH of the milk to the renneting pH within the selected period of time, said minimum amount of acidogen being determined based on the kinetics of transformation of the acidogen at said temperature of the milk and as a function of the volume of the milk and the selected period of time, whereby the milk is acidified for renneting and brought from the initial pH to the renneting pH solely by the acidogen;
   renneting the prepared milk by adding coagulating enzymes to the prepared milk; and then
   coagulating;
   forming;
   ripening and needling.

2. A process according to claim 1, wherein the exact predetermined renneting pH is between 6.0 and about 6.5.

3. A process according to claim 1, wherein the acidogen is introduced into a raw milk.

4. A process according to claim 1, wherein the acidogen is introduced into a raw milk having undergone a thermal treatment.

5. A process according to claim 1, wherein the amount of acidogen employed is from 2 to 2000 g/hl of milk.

6. A process according to claim 5, wherein the amount of acidogen employed is between 5 and 1000 g/hl of milk.

7. A process according to claim 6, wherein the amount of acidogen employed is between 10 and 500 g/hl of milk.

8. A process according to claim 1, wherein the acidogen is gluconodeltalactone (GDL).

9. A process according to claim 8, wherein the amount of GDL employed is from 5 to 500 g/hl of milk.

10. A process according to claim 9, wherein the amount of GDL employed is between 10 and 300 g/hl of milk.

11. A process according to claim 10, wherein the amount of GDL employed is between 20 and 200 g/hl of milk.

12. A process of claim 1, further comprising the step of adding lactic ferments to the milk prior to renneting, said lactic ferments being adding for organoleptic and textural purposes only and being added at a time and in an amount such that the lactic ferments do not influence acidification for obtaining the renneting pH of the milk by the acidogen.

* * * * *